US 9,699,586 B2

(12) United States Patent
Balabanis et al.

(10) Patent No.: US 9,699,586 B2
(45) Date of Patent: Jul. 4, 2017

(54) CONFIGURING A SOUND SYSTEM

(71) Applicant: Nokia Technologies Oy, Espoo (FI)

(72) Inventors: Niko Balabanis, Oulu (FI); Juha Johannes Salokannel, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/432,995

(22) PCT Filed: Oct. 2, 2012

(86) PCT No.: PCT/IB2012/055270
§ 371 (c)(1),
(2) Date: Apr. 1, 2015

(87) PCT Pub. No.: WO2014/053877
PCT Pub. Date: Apr. 10, 2014

(65) Prior Publication Data
US 2015/0264506 A1    Sep. 17, 2015

(51) Int. Cl.
*H04R 5/02* (2006.01)
*H04S 7/00* (2006.01)
(Continued)

(52) U.S. Cl.
CPC ............. *H04S 7/302* (2013.01); *G01S 5/02* (2013.01); *G01S 11/04* (2013.01); *H04R 5/00* (2013.01);
(Continued)

(58) Field of Classification Search
CPC . H04S 7/302; G01S 5/02; G01S 11/04; H04R 5/00; H04R 2205/024; H04R 2420/07; H04B 7/086
See application file for complete search history.

(56) References Cited

U.S. PATENT DOCUMENTS

2002/0159611 A1   10/2002   Cromer et al.
2004/0029558 A1   2/2004    Liu
(Continued)

FOREIGN PATENT DOCUMENTS

CN    101742609 A    6/2010
CN    101940041 A    1/2011
(Continued)

OTHER PUBLICATIONS

International Search Report and Written Opinion received for corresponding Patent Cooperation Treaty Application No. PCT/IB2012/055270, dated Jun. 19, 2013, 11 pages.
(Continued)

*Primary Examiner* — Andrew L Sniezek
(74) *Attorney, Agent, or Firm* — Locke Lord LLP

(57) ABSTRACT

A method of configuring an audio system comprising one or more speaker units, comprises: transmitting radio signals from at least a first location indicating a first speaker unit position, and from a second location indicating a second speaker unit position or a user position; receiving the signals at an antenna of the audio system; calculating an angle of arrival of the signals at the antenna; calculating the relative positions of the first and second locations based at least partially on the angle of arrival; and configuring the audio system based on the relative positions of the first and second locations.

14 Claims, 5 Drawing Sheets

(51) Int. Cl.
*G01S 5/02* (2010.01)
*G01S 11/04* (2006.01)
*H04R 5/00* (2006.01)
*H04B 7/08* (2006.01)

(52) U.S. Cl.
CPC ........ *H04B 7/086* (2013.01); *H04R 2205/024* (2013.01); *H04R 2420/07* (2013.01)

(56) References Cited

U.S. PATENT DOCUMENTS

| | | | |
|---|---|---|---|
| 2004/0071294 A1 | 4/2004 | Halgas et al. | |
| 2006/0177073 A1 | 8/2006 | Isaac et al. | |
| 2011/0064258 A1* | 3/2011 | Aggarwal | H04S 7/302 381/394 |
| 2012/0027226 A1 | 2/2012 | Desenberg | |
| 2013/0156198 A1* | 6/2013 | Kim | H04R 1/323 381/17 |
| 2015/0230041 A1* | 8/2015 | Fejzo | H04R 5/02 381/303 |

FOREIGN PATENT DOCUMENTS

| | | |
|---|---|---|
| CN | 102387273 A | 3/2012 |
| CN | 102387530 A | 3/2012 |
| GB | 2228324 | 8/1990 |
| WO | 2009/056150 A1 | 5/2009 |
| WO | 2012/042315 A1 | 4/2012 |
| WO | 2012042303 A1 | 4/2012 |

OTHER PUBLICATIONS

Office action received for corresponding Chinese Patent Application No. 201280077434.0, dated May 4, 2016, 10 pages of office action and no page of english language translation available.
Extended European Search Report received for corresponding European Patent Application No. 12886121.8, dated May 17, 2016, 6 pages.

* cited by examiner

CONFIGURING A SOUND SYSTEM

RELATED APPLICATION

This application was originally filed as PCT Application No. PCT/IB2012/055270 filed Oct. 2, 2012.

FIELD OF THE INVENTION

This invention relates to configuring a sound system.

BACKGROUND

There are a number of known techniques for determining the position of an apparatus using radio frequency signals. Some popular techniques relate to use of the Global Positioning System (GPS), in which multiple satellites orbiting Earth transmit radio frequency signals that enable a GPS receiver to determine its position. However, GPS is not effective in determining an accurate position indoors.

Positioning is important within audio systems as knowledge of the speaker positions and/or user position can be used to accurately configure the audio system to produce the best sound over an area or at the user position.

In audio systems, such as surround-sound audio systems, microphones are used to determine the delay in an audio signal and consequently the distance to the speaker that generated the audio signal.

An indoor positioning system using positioning receivers that calculate a bearing from which signals are received has been proposed and is described in WO2012/042315 and some other publications.

SUMMARY OF THE INVENTION

A first aspect of the invention comprises a method of configuring an audio system comprising one or more speaker units, the method comprising:
  transmitting radio signals from at least a first location indicating a first speaker unit position, and from a second location indicating a second speaker unit position or a user position;
  receiving the signals at an antenna of the audio system;
  calculating an angle of arrival of the signals at the antenna;
  calculating the relative positions of the first and second locations based at least partially on the angle of arrival; and
  configuring the audio system based on the relative positions of the first and second locations.

The antenna may comprise a plurality of antenna elements, and the received signals at the plurality of antenna elements may be analysed to determine an angle of arrival of the signal.

The audio system may comprise a mobile device configured to transmit signals indicating the user position.

The antenna may be located in at least one speaker unit and/or in a central unit of the audio system connected to the one or more speaker units.

The signals from the first location indicating the speaker unit position may be transmitted from a mobile device located temporarily at the speaker unit position.

The audio system may be configured to automatically determine parameters for controlling the speaker unit(s) based on the determined relative positions of the speaker unit(s) and user position.

Radio signals from the first location may indicate the first speaker unit position, and radio signals from the second location may indicate the second speaker unit position, and radio signals from a third location may indicate the user position.

The method may further comprise calculating the relative bearings and/or positions of the first and second locations in a bearing calculation apparatus which is remote from the audio system.

The or each speaker unit may comprise an antenna configured to transmit radio signals to a said antenna of the audio system to at least partially determine the position of the speaker unit relative to a further speaker unit or a user position.

The mobile device may be a remote control for operating the audio system.

The signals may be Bluetooth Low Energy signals.

The method may comprise calculating distance between the first location and the second location.

The invention also comprises a computer program product comprising computer-executable instructions that when executed by a computing apparatus causes it to perform any of the method described above.

A second aspect of the invention provides an audio system comprising:
  a transmitter for transmitting radio signals from at least a first location indicating a first speaker unit position, and from a second location indicating a second speaker unit position or a user position;
  a receiver for receiving the signals at an antenna of the audio system;
  one or more processors and one or more memories including computer program code, the one or more memories and the computer program code configured to, with the one or more processors, cause the audio system at least to perform:
    calculating an angle of arrival of the signals at the antenna;
    calculating the relative positions of the first and second locations based at least partially on the angle of arrival; and
    configuring the audio system based on the relative positions of the first and second locations.

The antenna may comprise a plurality of antenna elements, and the received signals at the plurality of antenna elements are analysed to determine an angle of arrival of the signal.

The audio system may further comprise a mobile device configured to transmit signals indicating the user position.

The antenna may be located in at least one speaker unit and/or in a central unit of the audio system connected to the one or more speaker units.

The signals from the first location indicating the speaker unit position may be transmitted from a mobile device located temporarily at the speaker unit position.

The audio system may be further configured to automatically determine parameters for controlling the speaker unit(s) based on the determined relative positions of the speaker unit(s) and user position.

Radio signals from the first location may indicate the first speaker unit position, and radio signals from the second location may indicate the second speaker unit position, and radio signals from a third location may indicate the user position A bearing calculation apparatus, remote from the audio system, may be configured to calculate the relative bearings and/or positions of the first and second locations.

The or each speaker unit may comprise an antenna configured to transmit radio signals to a said antenna of the audio system to at least partially determine the position of the speaker unit relative to a further speaker unit or a user position.

The mobile device may be a remote control for operating the audio system.

The signals may be Bluetooth Low Energy signals.

The processor may be configured to calculate distance between the first location and the second location.

A third aspect of the invention provides an audio system comprising: a transmitter configured to transmit radio signals from at least a first location indicating a first speaker unit position, and from a second location indicating a second speaker unit position or a user position; an antenna configured to receive the signals; a processor configured to: calculate an angle of arrival of the signals at the antenna; calculate the relative positions of the first and second locations based at least partially on the angle of arrival; and configure the audio system based on the relative positions of the first and second locations.

A fourth aspect of the invention provides a computer readable medium having stored thereon machine readable instructions that when executed by computing apparatus of an audio system control it to perform a method comprising: transmitting radio signals from at least a first location indicating a first speaker unit position, and from a second location indicating a second speaker unit position or a user position; receiving the signals at an antenna of the audio system; calculating an angle of arrival of the signals at the antenna; calculating the relative positions of the first and second locations based at least partially on the angle of arrival; and configuring the audio system based on the relative positions of the first and second locations.

BRIEF DESCRIPTION OF THE DRAWINGS

For a better understanding of various embodiments of the present invention reference will now be made by way of example only to the accompanying drawings in which.

DETAILED DESCRIPTION OF EMBODIMENTS OF THE INVENTION

Described below is a system and method for configuring an audio system comprising at least one speaker unit. Audio system configuration is determined by the location of the speaker units and optionally a location of a user relative to each of the speaker units in the system. Prior to configuring the audio system, speaker unit locations and optionally the user location are determined. Locations are determined using a multi-element antenna situated in either a central audio unit or in each of the speaker units. Parameters of the audio system can then be automatically set according to the determined locations.

Figure 1:
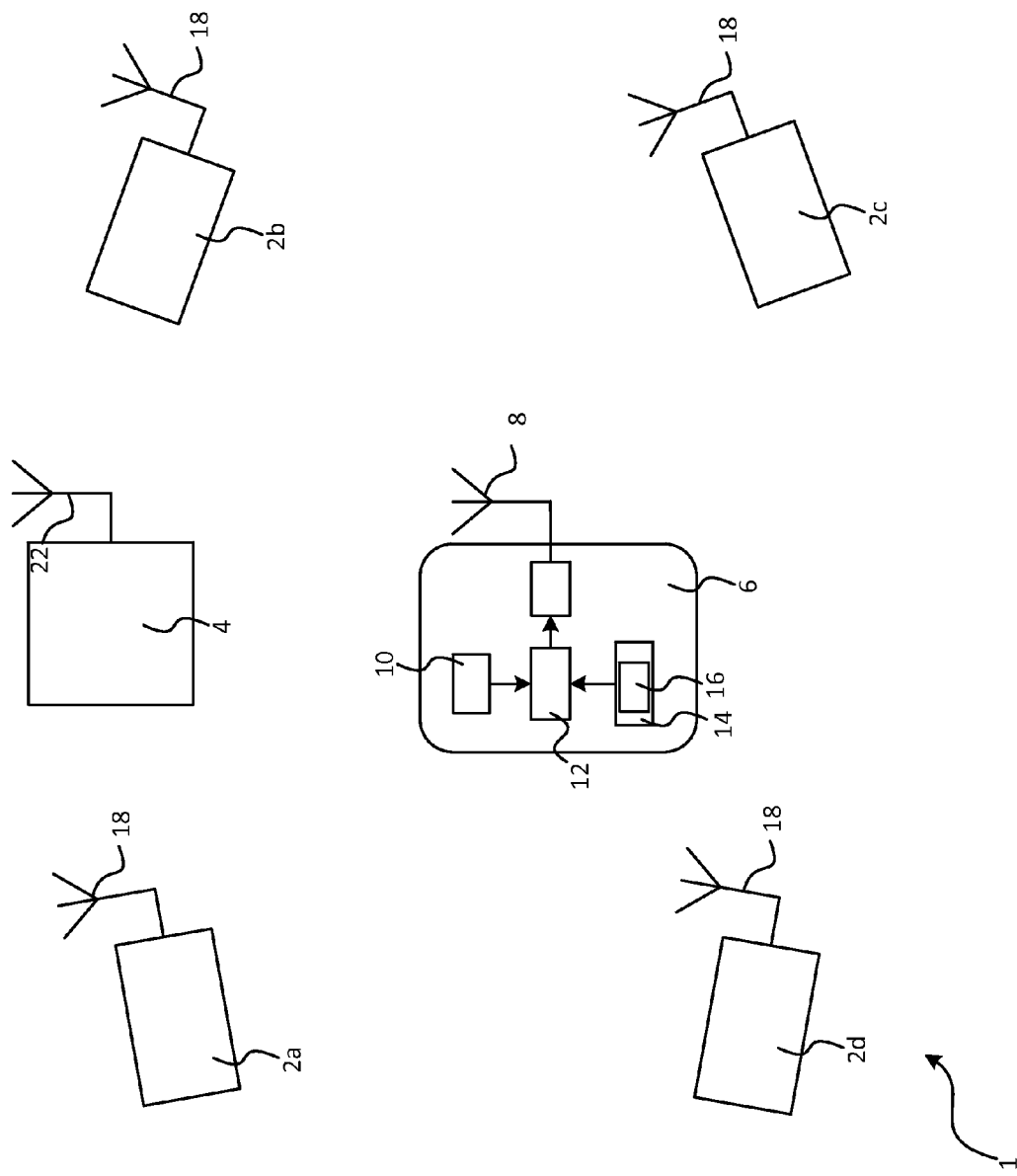
FIG. 1 illustrates an apparatus according to aspects of the invention.

FIG. 1 illustrates an audio system 1, in particular a surround-sound audio system. The system 1 comprises at least one speaker unit 2, and is illustrated having four speaker units 2a, 2b, 2c, 2d. Each speaker unit 2 comprises one or more speakers configured to generate an audible sound under the control of the audio system 1. The speaker units 2 will be described in more detail with reference to FIG. 2 later.

The system 1 further comprises an audio system central unit 4. The audio system central unit 4 is illustrated as separate to a speaker unit 2. Alternatively, the audio system central unit 4 is incorporated at the location of one of the speaker units 2, e.g. within a housing of the speaker unit 2.

The audio system central unit 4 is configured to receive audio data, for example from a broadcast signal (e.g. television signal), a digital file or physical media (e.g. a Compact Disc (CD)). The audio system central unit 4 is arranged to process the received audio data according to the determined locations. The audio system is automatically configured with parameters or settings according to the determined locations, to automatically set-up the audio system. The processing can include one or more of: selectively transmitting only a part of the audio data to one or more speaker units, modifying a time delay on one or more of the speakers or adjusting a volume of sound generated by one or more of the speakers relative to another speaker.

The speaker units 2 are coupled to the audio system central unit 4, for example, via a wired connection. The speaker units 2 may be connected to the audio system central unit 4 via an audio cable. Alternatively, the speakers may be coupled to the audio system central unit 4 via a wireless connection. The speaker units 2 may have power transferred to them by one or more of the wired connection, a battery in the speaker unit 2 to provide power to at least some components, and/or a mains electricity connection.

In some embodiments, the audio system 1 comprises a mobile device 6. The mobile device 6 may, for example, be a hand portable electronic device such as a mobile radiotelephone. In some embodiments the mobile device 6 may be a remote control for operating the audio system 1. In some embodiments, the mobile device 6 may be a positioning tag. In some examples, the mobile device 6 may control the audio system 1, may be used for determining position, or may have further functionality, e.g. as a mobile radiotelephone.

The mobile device 6 in the embodiment described in FIG. 1 can indicate to the audio system 1 a position to which the audio system is set-up to deliver an optimum sound. For example, the position can indicate where a user is located, e.g. the location at which the user will be sitting to listen to the audio system 1.

The audio system 1 is configured to determine the location of the speaker unit(s) 2, and a location of the remote control, according to the steps outlined below. In some aspects, a transmission (e.g. a radio transmission) is made between the speaker unit 2 locations (and a mobile device 6) and/or the central unit 4. The transmission is distinct from the audio output of the speakers. The transmission is analysed to determine a bearing of the transmission. In some examples, the transmission also provides a range. The bearing and range information is used to determine the positions of the speaker units 2 relative to each other, relative to the remote control and/or relative to the central unit 4. In particular embodiments, any of the speaker unit(s) 2, remote control 6, central unit 4 or one or more external device(s) are configured to transmit, receive or analyse the positioning transmissions, for example, as described in the embodiments below.

In a first embodiment of audio system shown in FIG. 1, the mobile device 6 is configured to generate and transmit a positioning signal. The signal is transmitted in the form of packets. For example, a processor 12 in the mobile device 6 is configured to generate positioning signals in the form of positioning packets. The positioning packets comprise a header and a payload. The header may contain an identifier of the mobile device 6. The processor 12 is further configured to activate a wireless transmitter 8 to transmit the positioning signal.

The mobile device 6 can comprise a switch 10. The switch 10 is operable by a user, to transmit the positioning signals. The switch 10 can be a physical button, or can be part of a user interface (UI) embodied as software on the mobile device.

The transmitter 8 may transmit the positioning signal as a radio signal and can transmit the positioning signal periodically. The radio signals may, for example, have a transmission range of 300 meters or less. For example, the radio signals may be 802.11 wireless local area network (WLAN) signals, Bluetooth signals, Bluetooth Low Energy (BT LE) signals, Ultra wideband (UWB) signals or Zigbee signals.

One or more of the speaker units 2 comprise an antenna 18. The antenna 18 comprises a plurality of antenna elements arranged in an array. The antenna 18 receives the positioning signals transmitted by the mobile device 6. The antenna 18 is configured such that the received positioning signals can be used to calculate an angle of arrival (AoA) of the positioning signals from the mobile device 6, from which a position of the mobile device can be at least partially based. The transmission of positioning signals from the mobile device 6 is received by a plurality of speaker units 2. The data from analyzing the positioning signals received by all the speaker units is processed to determine the relative location of the mobile device 6 relative to the speaker units 2. The relative location or position of the mobile device 6 is used to configure the audio system. In particular, the central unit 4 receives the determination of the relative positions of the speaker unit(s) relative to another speaker unit(s) and/or the mobile device 6, and configures the audio system 1 accordingly to optimize sound at, or around, the mobile device 6.

In some embodiments, the speaker units 2 may be configured to transmit a signal in the form of positioning packets, e.g. through the antenna 18. The speaker units 2 comprise a transceiver to transmit and receive positioning signals. The positioning signals transmitted by one of the speaker unit can be received by another of the speaker units 2 and/or the central unit 4, e.g. by the antenna 22. The transmission by the speaker units can be used to determine the position and orientation of each the speaker units compared to the central unit. Alternatively, other methods can be used to determine the orientation of the speakers units, for example, comparing the calculated angle of arrival with other speaker units and/or with an angle of arrival at the central unit. The positioning functionality of the speaker units 2 will be described in more detail with reference to FIG. 2.

The mobile device 6 further comprises a storage device or memory 14. The storage device or memory 14 may store computer program instructions 16 that, when loaded into the processor 12, control the operation of the mobile device 6. The computer program instructions 16 may provide the logic and routines that enables the apparatus to perform the functionality described above. The computer program instructions 16 may arrive at the mobile device 6 via an electromagnetic carrier signal or be copied from a physical entity such as a computer program product, a memory device or a record medium.

Figure 2:
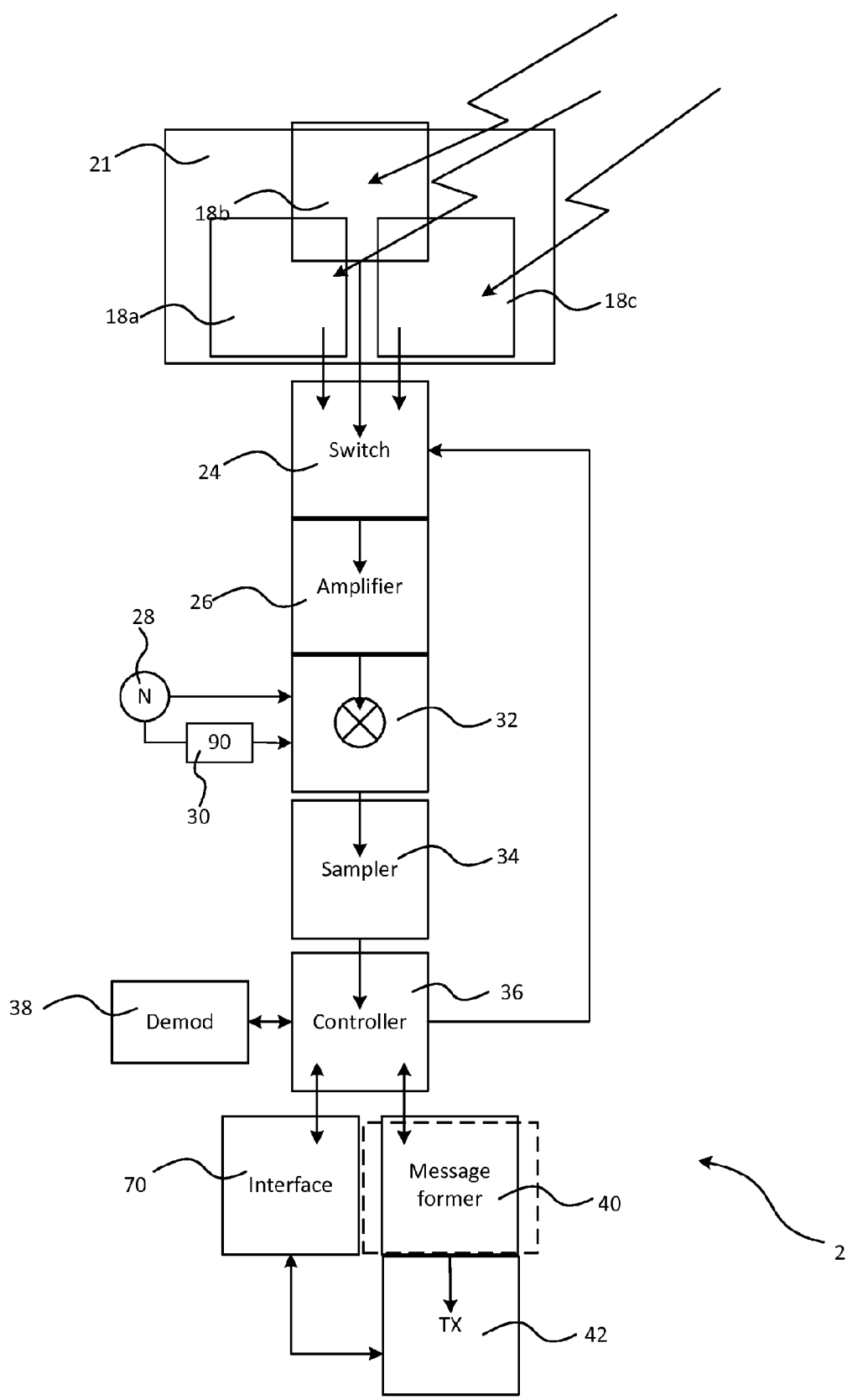
FIG. 2 is a schematic diagram of a speaker unit according to aspects of the invention.

FIG. 2 schematically illustrates one example of a speaker unit 2 according to some of the embodiments described in FIG. 1. The speaker unit 2 comprises an antenna array 21 comprising a plurality of antenna elements 18a, 18b, 18c (as an array, 18) which positioning signals transmitted from the mobile device 6. Although three antenna elements are shown, three is the minimum and the embodiments described here may include more than three antenna elements.

In some embodiments the speaker unit(s) 2 takes I and Q samples of a predefined portion of the received signals. The I and Q samples are transmitted by the speaker units 2 to a bearing calculation apparatus (not shown) for processing. The bearing calculation apparatus may be a third-party server (not shown). In other embodiments, the audio system central unit 4 may perform the function of the bearing calculation apparatus. In other embodiments, the speaker units 2 comprise a processor to perform the function of the bearing calculation apparatus.

The bearing calculation apparatus uses the received samples to calculate a bearing to the mobile device 6 from the speaker units 2. The bearing calculation apparatus may also configured to calculate the distance of the mobile device 6 from the speaker units 2. The bearing calculation apparatus is configured to calculate the position of the mobile device 6 relative to the speaker units 2. The relative position may be expressed relative to the central unit 4, in geographical coordinates, or any other suitable units. In other embodiments, the bearing calculation apparatus calculates the position of the speaker units 2 relative to each other.

Each of the plurality of antenna elements 18a, 18b, 18c is connected to a switch 24, which is controllable by a controller 36 as described below. The switch 24 is controlled so that only one of the antenna elements 18a, 18b, 18c is connected to an amplifier 26, such as a low noise amplifier (LNA), at a given time. The output of the amplifier 26 is received at a mixer arrangement 32. This is provided with in-phase (I) or quadrature (Q) signals by an arrangement of a local oscillator 28, which may be analogue or digital, and a 90° phase shifter 30. A sampler 34 is configured to receive I and Q output signals from the mixer arrangement and take digital samples thereof. The sampler 34 may take any suitable form, for instance including two analogue to digital converter (ADC) channels, one for the I channel and one for the Q channel. The effect of the mixer arrangement 32 and the sampler 34 is to downconvert the received signals and to provide digital I and Q samples of the downmixed signals.

The sampler 34 is coupled to a controller 36. The controller 36 is configured to control the other components of the speaker unit 2. The controller 36 may take any suitable form. For instance, it may comprise processing circuitry, including one or more processors, and a storage device, comprising a single memory unit or a plurality of memory units. The storage device may store computer program instructions that, when loaded into processing circuitry, control the operation of the speaker unit 2 in FIG. 1. The computer program instructions 34 may provide the logic and routines that enables the apparatus to perform the functionality described above. The computer program instructions 34 may arrive at the apparatus 2 via an electromagnetic carrier signal or be copied from a physical entity such as a computer program product, a non-volatile electronic memory device (e.g. flash memory) or a record medium such as a CD-ROM or DVD. Typically, the controller 36 comprises a processor coupled connected to both volatile memory and non-volatile memory. The computer program is stored in the non-volatile memory and is executed by the processor using the volatile memory for temporary storage of data or data and instructions. Examples of volatile memory include RAM, DRAM, SDRAM etc. Examples of non-volatile memory include ROM, PROM, EEPROM, flash memory, optical storage, magnetic storage, etc. The term 'memory' when used in this specification is intended to relate primarily to memory comprising both non-volatile memory and volatile memory unless the context implies otherwise, although the term may also cover one or more volatile memories only, one or more non-volatile memories only, or one or more volatile memories and one or more non-volatile memories.

The processing circuitry may be any type of processing circuitry. For example, the processing circuitry may be a programmable processor that interprets computer program instructions and processes data. The processing circuitry may include plural programmable processors. Alternatively, the processing circuitry may be, for example, programmable hardware with embedded firmware. The processing circuitry may be a single integrated circuit or a set of integrated circuits (i.e. a chipset). The processing circuitry may also be a hardwired, application-specific integrated circuit (ASIC). The processing circuitry may be termed processing means.

The controller 36 operates to control the switch 24 to connect the antenna elements 18a, 18b, 18c to the amplifier 26 in turn. The controller 36 containing the above processing circuitry controls the switch 24 to connect one of the antenna elements 18a, 18b, 18c to the Low Noise Amplifier (LNA) 26 for the duration of transmission of the header of a packet transmitted by the mobile device 6 or another speaker unit 2. After the header has been received, the controller 36 controls the switch 24 to connect a different one of the antenna elements 18a, 18b, 18c to the LNA 26 in a sequence. The interval between successive switching of the switch 24 is approximately equal to the symbol rate used in the payload of the transmitted packets.

An output of the controller 36 is provided to a demodulator 38. The demodulator 38 is configured to demodulate data modulated onto signals received by the antenna elements 18a, 18b, 18c and extract therefrom an identifier relating to a mobile device 6 or a speaker unit 2 that transmitted the received signals.

Another output of the controller 36 may optionally be coupled to a message former 40. The message former 40 generates a message comprising I and Q samples of the downconverted signals from each of the antenna elements 18a, 18b, 18c and the identifier. The message former 40 may be comprised solely of the controller 36. The message is then passed to a transmitter 42, from where it is transmitted. The message may be transmitted wirelessly. Alternatively the message may be transmitted via a wired connection. The message may broadcast such that it can be received by a bearing calculation apparatus.

The message may include plural data packets, each including a header and a payload. The headers of the packets include an identifier relating to and identifying the speaker unit 2, and optionally the mobile device 6. The payloads include the I and Q samples and the identifier demodulated from the signals received by the speaker unit 2. The I and Q samples and identifier relating to one signal received at the speaker unit 2 may be included in one positioning packet, or split across multiple positioning packets. One positioning packet may include I and Q samples and identifiers relating to two or more signals received at the speaker unit 2, although advantageously each packet relates to only one signal.

In one embodiment, a sixteen antenna element array 18 is used. In this system, each antenna element 18a is sampled twice although one antenna element 18a (a reference element) is sampled more frequently. Performing three measurements results in 104 samples which, with one byte for each I and Q sample, totals 208 bytes of data. These bytes are included in the message.

The I and Q samples constitute complex signal parameters in that the I and Q samples together define parameters of a complex signal.

Instead of transmitting 'raw' I and Q samples for analysis, the controller 36 may process the I and Q samples to provide other complex signal parameters relating to the received signals, from which bearing calculation can be performed. For instance, the controller 36 may provide averaging of the I and Q samples in the angle/phase domain before converting the averages back to the I and Q domain (one sample for each antenna element) and providing the averaged samples as complex signal parameters. Alternatively, the controller 36 may calculate amplitude and/or phase information from the I and Q samples, and provide the amplitude, phase or phase and amplitude information as complex signal parameters.

Whatever form is taken by the complex signal parameters, they are included in a message as described above. The message may be transmitted wirelessly, for instance using radio signals. The radio signals may have a transmission range of 300 meters or less. For example, the radio frequency signals may be 802.11 wireless local area network (WLAN) signals, Bluetooth or Bluetooth Low Energy signals, Ultra wideband (UWB) signals or Zigbee signals.

The message may be received at the bearing calculation apparatus (embodied as previously described). The message may be relayed by a device, for instance, the central unit 4, before it reaches the destination of the bearing calculation apparatus.

WO2009/056150 and WO2012/042303 describe various positioning systems and methods, which may be similar to those described above.

Once complex samples from each antenna element are obtained, the array output vector y(n) (also called a snapshot) can be formed:

$$y(n)=[x_1, x_2, \ldots, x_M] \quad (1)$$

Where $x_i$ is the complex signal received from the ith antenna element, n is the index of the measurement and M is the number of elements in the array 18.

An Angle of Arrival (AoA) can be estimated from the measured snapshots if the complex array transfer function $a(\phi,\theta)$ of the RX array 36 is known, which it is from calibration data.

The simplest way to estimate putative AoAs is to use beamforming, i.e. calculate received power related to all possible AoAs. The well known formula for the conventional beamformer is $$P_{BF}(\phi,\theta)=a^*(\phi,\theta)\check{R}a(\phi,\theta) \quad (2)$$

Where, $$\check{R} = \frac{1}{N}\sum_{n=1}^{N} y(n)y*(n)$$

is the sample estimate of the covariance matrix of the received signals, $a(\phi,\theta)$ is the array transfer function related to the AoA$(\phi,\theta)$, $\phi$ is the azimuth angle and $\theta$ is the elevation angle.

Once the output power of the beamformer $P_{BF}(\phi,\theta)$ is calculated in all possible AoAs, the combination of azimuth and elevation angles with the highest output power is selected to be the bearing.

The performance of the system depends on the properties of the antenna array. For example the array transfer functions $a(\phi,\theta)$ related to different AoAs should have as low correlation as possible for obtaining unambiguous results.

Correlation depends on the individual radiation patterns of the antenna elements, inter element distances and array geometry. Also the number of array elements has an effect on performance. The more elements the array 18 has the more accurate the bearing estimation becomes. In minimum there are at least three antenna elements 18a, 18b, 18c in a planar array configurations but in practice or more elements provide better performance.

The calculation and/or antenna can be simplified by considering only the azimuth angle. Thus, the audio system is modelled as a two-dimension arrangement of speaker units and the mobile device over an area of a room or space. A height of the speaker units or height of the remote control above a floor of the room is not considered. Alternatively, the audio system can be configured based on both azimuth angle and elevation angle. The audio system can use input constraint information if a particular geometry of the space or room in which the audio system located is known, in order to calculate the bearing and/or range of the transmitter.

In some embodiments, the speaker unit 2 does not have a message former 40. In these embodiments, the speaker unit 2 performs the function of the bearing calculation device. The processor within the controller 36 is configured to calculate the bearing to the mobile device 6 or speaker unit 2, using the received samples.

The processor may also be configured to calculate the distance to the mobile device 6 or speaker units 2. The processor can calculate the distance to the devices in any suitable way.

For instance, distance may be inferred from received radio signal strength. Received signal strength provides an indication of distance because signal strength decreases over distance according to a distance squared law. In the case of the radio signals being Bluetooth Low Energy signals, distance measurement using received signal strength is relatively easy. This is because BT LE signals are transmitted at one power level so a receiver knows the transmit power without requiring a measure of the transmit power to be communicated to it. Distance measurement using received signal strength can be reliable, although its reliability is dependent on the particular environment. The same applies to other systems in which transmit power is the same for all transmitters. For systems in which transmit power may vary, an indication of transmit power may be needed in order for the receiver to measure distance to the transmitter.

Alternatively, the calculation may be based on the amplitude or signal strength of received audio signals. For a known transmission amplitude, a measured lower receive amplitude can be used to calculate (e.g. using a look-up table) a range between the transmitter and receiver. Alternatively, the calculation may be a round-trip time of flight calculation. In particular, an antenna in the mobile device, speaker unit or central unit can record the time taken between a transmission and a return signal from another of the mobile device, speaker unit or central unit, allowing for a known processing delay. Alternatively, the calculation may be by analysis of the pattern of the received signal. Alternatively, a distance between one transmitter and receiver is known, for example by being pre-set, manually input by a user, or calculated by a separate method. The bearing information and a single distance allows calculation of the further distances and positions of the speaker units and mobile device.

The distance calculation can be carried out in the controller 36, which is further configured to calculate the relative position of the mobile device 6 with reference to each speaker unit 2. Bearings from the mobile device 6 to plural speaker units 2 can be used to improve the accuracy of the location determination. Alternatively, range calculations can be carried out in the central unit, or a remote device, e.g. bearing calculation apparatus.

The various distances between the components of the system (speaker units 2, central unit 4 and the mobile device 6, in various combinations) may be calculated relatively accurately through the inclusion of two receivers for which the distance between the receivers can be calculated (for instance using one of the techniques described above). By calculating the bearing to the two receivers from a transmitter and by calculating the bearing between the two receivers, the controller 36 can calculate the relative positions of the transmitter and the two receivers using triangulation. By applying this to all the components of the system, the relative positions of the components can be calculated accurately without explicitly measuring the distances between any components. Providing the system with two receivers increases the cost of the hardware, but it can improves the accuracy of position determination.

In some embodiments, the controller 36 of the speaker unit 2 is coupled to an interface 70. In some embodiments, the interface 70 is coupled to the transmitter 42. Alternatively or in addition to the transmitter 42, the interface 70 could be wired. The interface 70 is configured to couple the audio speaker unit 2 to the audio system central unit 4. In addition, the interface may be configured to couple the speaker unit 2 to other speaker units 2.

The wireless transmitter 42 is configured to transmit a radio signal. The radio signal may be of any type, for example, the radio frequency signals may be 802.11 wireless local area network (WLAN) signals, audio signals, Bluetooth or Bluetooth Low Energy signals, Ultra wideband (UWB) signals or Zigbee signals. The radio signals are sent to the central unit 4. The radio signals may comprise a header and payload as previously described with reference to the mobile device 6. In other embodiments the radio signal may comprise the calculated relative position of the mobile device 6. In other embodiments, the speaker unit 2 is configured to transmit both a positioning signal and the calculated relative position of the mobile device 6.

On calculation of the relative positions of speaker units 2 and the mobile device 6, a sound system controller in the central unit 4 is configured to calculate the optimal settings for each of the speaker units 2 individually. In some embodiments, the sound system controller can be incorporated into controller 36 of each speaker unit 2. Settings may comprise any or all of the well known features associated with sound waves, for example volume, time delay, bass, fade, and treble. In particular, the settings are determined to give an optimal sound level to a user, e.g. at or around the location of the mobile device 6. For example, in a surround-sound audio system, "rear" speakers 2c, 2d will need to be configured to be quieter than the "front" speakers 2a, 2b, and have a delay associated with them, if the user is closer to the "back" of the system. Speaker unit assignment, or labels, may be preconfigured. In other embodiments, the audio system 1 assumes the orientation of the user and automatically determines front, back, left, and right speaker 2 assignments based on user location and orientation. The optimal settings relating to each speaker unit 2 are stored in memory. Audio signals transmitted to the speaker units 2 from the central unit 4 via the interface 70 are adjusted using the relevant optimal settings.

Figure 3:
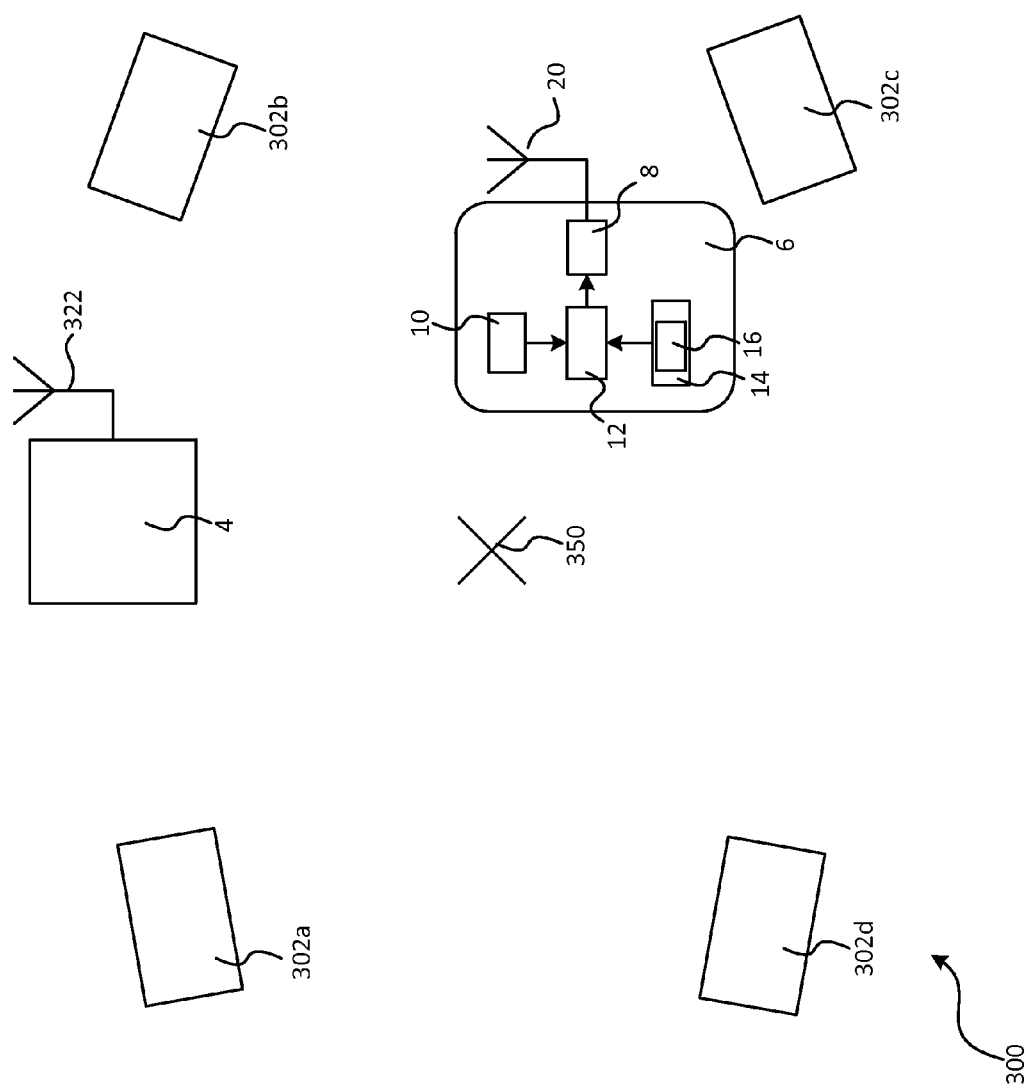
FIG. 3 illustrates an apparatus according to aspects of the invention.

FIG. 3 illustrates a further embodiment of a surround-sound audio system 300. The system 300 comprises a mobile device 6. The mobile device 6 is configured in the same way as the mobile device 6 of the previously-described embodiment. The system 300 further comprises at least one speaker unit 302. The speaker units 302 are conventional speaker units comprising at least one speaker, and connected to an audio system central unit 4. The speaker units 302 do not comprise an antenna or transceiver, as described with respect to the earlier embodiment.

The system 300 comprises the audio system central unit 4, configured substantially as described above. The central unit 4 comprises an antenna 322 comprising a plurality of antenna elements, as described as part of the speaker units above. The central unit 4 is configured to receive positioning signals from a transmitter in the mobile device 6 when the mobile device 6 is positioned at each speaker unit 302 location sequentially. The central unit 4 is also configured to receive positioning signals from the mobile device 6 to indicate a position of the user for which the audio system is to be configured. The audio system is configured to calculate, or receive a calculation, of the relative positions of each location of the speaker units and the listening position of the user, according to the method described above.

Briefly describing the embodiment depicted in FIG. 3, and a method of operation, the mobile device 6 is first temporarily positioned at the location of the first speaker 302a. For example, the mobile device is briefly held above or in close proximity to the speaker unit by the user. The mobile device 6 is commanded to transmit positioning signals, for example by activating a switch 10. The positioning signals are identified as arriving from the position of a speaker unit 302a. For example, the mobile device 6 receives an input from a user (e.g. into the user interface) that the mobile device is at the position of a speaker unit. The identification of a speaker unit position as the source of the positioning signals can be included in the positioning signals, e.g. in a header of a packet. Alternatively, the audio system can be pre-set to expect a particular order of positions to be transmitted as part of the configuration process.

The positioning signals transmitted are received by the antenna of the central unit 4. The received signals are analysed as described above, and the position of the mobile device 6 is calculated by any of the means previously described. The mobile device is then moved to the position of a second speaker 302b, if applicable, and the process of transmitting a positioning signal from the mobile device 6 to the central unit 4 is repeated. The position of the speaker units 302c, 302d are also sequentially determined by repeating this process.

Once this process has been performed for each speaker unit 2, the mobile device 6 is moved to the location 350 at which the audio system is to be configured to provide optimum sound.

This embodiments has the advantage the speaker units do not need to include a transceiver or antenna. The speaker units can be wholly conventional, and function only as speakers under the control of the audio unit. The mobile device 6 and central unit 4 only require a transmitter and receiver respectively. The mobile device 6 and central unit 4 can comprise transceivers.

For example, the mobile device 6 may be a remote control. The remote control can operate the audio system, which can be part of an audio-visual system which includes a TV and/or image processing device and separate speakers.

The bearing calculation apparatus, which may take any of the forms previously described, calculates the bearing to, distance to, the mobile device 6 when positioned at each of the speaker 302 locations. Parameters and settings of the audio system are then set as described above.

The central unit 4 of this embodiment can be a stand-alone device, as shown. Alternatively, the central unit 4 can be incorporated within a speaker unit, or within any other part of an audio-visual system.

Figure 4:
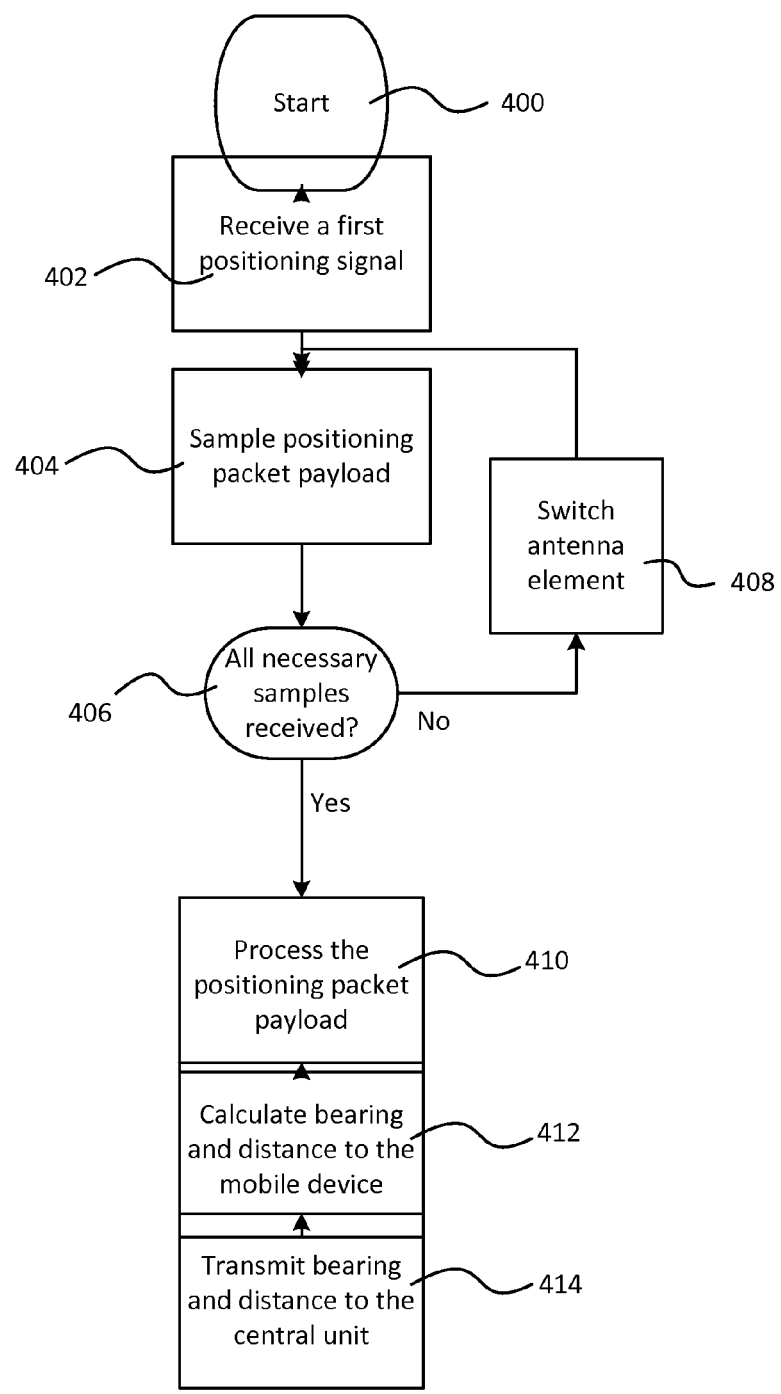
FIG. 4 is a flow chart illustrating operation of the FIG. 2 speaker unit apparatus according to aspects of the invention.

FIG. 4 is a flow chart illustrating operation of a speaker unit 2 according to the embodiment described in FIG. 1.

The configuration process starts at step 400. For example, the configuration process is started by an input from a user, or by powering on the audio system for the first time. At step 402, the speaker unit 2 and/or central unit 4 receives a signal from a mobile device 6. The signal can indicate that audio configuration is required. The signal may be in the form of a positioning packet, which is incident on the antenna array 18 of the speaker unit 2 and/or central unit 4. The positioning signal can indicate a position of a user for which the audio system is to be configured and/or a position of a speaker unit 2, 302.

In some examples, the speaker unit 2 may transmit its own positioning packet. The transmission can be from an antenna 18 attached to the speaker unit 2.

The positioning packets include a header and a payload. The header is received and decoded. This utilises only one of the antenna elements 18a-c. Sampling of the payload in step 406 to obtain I and Q samples from different antenna elements 18a-c involves switching the switch 24 between the antenna elements 18a-c in sequence.

In step 404, a first sample of the positioning packet payload is taken using a first antenna element 18a. At step 406, it is determined whether all the necessary samples have been made. This step only produces a positive result when all the antenna elements have been sampled at least twice. On a negative result, the method proceeds to step 408. Here, the controller 36 operates to control the switch 24 to connect a different one of the antenna elements 18a-c to the LNA 26. After step 408, the method returns to step 404, where a further sample of the positioning packet payload is taken. This time, a second antenna element 18b is used because switching has taken place.

The method remains in a loop of steps 404, 406, and 408 until step 406 yields a positive result. In the loop, the at least three antenna elements 18a, 18b, 18c are controlled to be connected by the switch 24 to the LNA 26 in turn. The controller 36 controls the switch 24 to connect a different one of the antenna elements 18a, 18b, 18c to the LNA 26 in any suitable sequence. The interval between successive switching of the switch 24 is approximately equal to the symbol rate used in the payload of the transmitted packets.

Once step 406 yields a positive determination, the controller 36 processes the packet payload in step 410. This involves sampling the I and Q samples as previously described. In some embodiments, processing also comprises using a message former 40 to repackage the positioning packets as messages. In some embodiments, not shown in FIG. 4, processing may also involve transmitting the messages to a bearing calculation apparatus.

In FIG. 4, the speaker unit 2 is also the bearing calculation apparatus. In step 412 the controller 36 uses the samples to calculate a bearing to the mobile device 6 from the speaker unit 2. The controller 36 may also be configured to calculate the distance to the mobile device 6 by any suitable means. Distance calculation may involve detecting amplitude of an audio tone. The results of the calculations are stored in memory, along with the mobile device 6 identifier. In some embodiments, step 412 is performed by a separate bearing calculation apparatus.

Next, in step 414, the bearing to the mobile device 6 is transmitted to the central unit 4 along with an identifier of the speaker unit 2. A distance associated with the bearing is also transmitted to the central unit 4, if also calculated by the separate bearing calculation apparatus. Alternatively, the bearing and distance information is further processed into a format which can be interpreted by the central unit. For example, only distances from the speaker units to the user position can be transmitted to the central unit, or calculated within the central unit.

Figure 5:
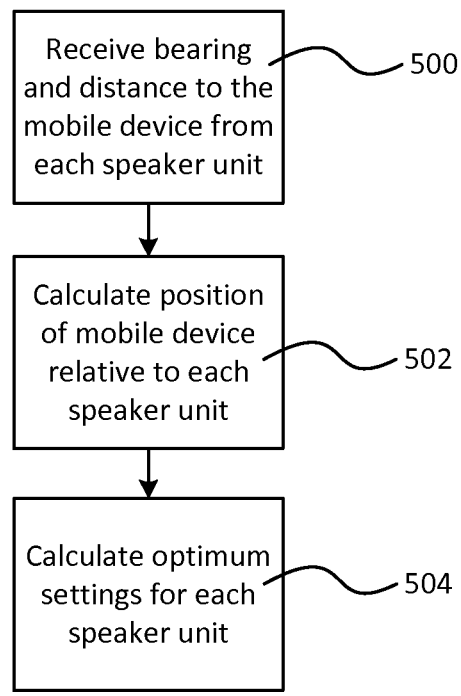
FIG. 5 is a flow chart illustrating operation of the FIG. 1 central unit apparatus according to aspects of the invention

FIG. 5 is a flow chart illustrating operation of a central unit 4 according to aspects of the invention.

In step 500, a receiver 22 of the central unit 4 receives the bearing and distance to the mobile device 6 from each speaker unit 2. In step 502, at least one processor in the central unit 4 is configured to calculate the position of the mobile device 6 relative to each speaker unit 2. The relative position may be expressed in geographical coordinates, latitude and longitude, or any other suitable means. Alternatively, only the distance information or position information is received by the central unit. The central unit 4 may not perform any calculation of positioning.

The configuration settings for the speaker units 2 are calculated by the audio system central unit 4 in step 504. Configuration may comprise adjusting and storing settings for each speaker unit 2. In some embodiments, configuration settings are transmitted to the speaker units 2. In other embodiments, the audio system central unit 4 applies the settings to audio signals transmitted to each of the speaker units 2.

In summary, the method above comprises transmitting radio signals from at least a first location indicating a speaker unit position, and optionally a second location indicating a user position. The signals may be in the form of data packets. The signals are transmitted from at least one device. The device at the first location is a speaker unit 2. In some embodiments, the device at the second location may be the mobile device 6 indicating a user position. Alternatively, the device at the second location may be a speaker unit 2. The signals are received at step 400 at a speaker unit 2 or a central unit 4. The angle of arrival of the signals are calculated in step 412. The relative positions of the first and second locations are calculated by a separate apparatus or the central unit 4. At step 504, the audio speaker arrangement is configured based on the relative positions of the locations.

In a further embodiment, the speaker units are configured to transmit positioning signals. The central unit is configured to receive the positioning signals from the speaker units, and calculate or receive a bearing and/or range of the speaker units, as described. The mobile device 6 can also transmit positioning signals which are also received by the central unit 4 and/or speaker units 2. The positions of the speaker units and user position can be calculated with respect to the central unit. Therefore, the central unit 4 can calculate a bearing and distance to each speaker unit 2 relative to itself.

In some embodiments the speaker units 2, 302 may all be identical. In other embodiments one or more of the speaker units 2, 302 are different, for example configured to generate sound within different audio ranges. For example, one of the speakers can generate bass sound, e.g. a subwoofer. In some embodiments the audio system central unit 4 may be housed separately or with a speaker, e.g. a subwoofer.

In some embodiments, the bearing calculation apparatus may be a speaker unit 2 or speaker unit 302. In other embodiments, the bearing calculation apparatus may be the mobile device 6.

The previously-described embodiments and examples relate to surround-sound audio systems for a home entertainment environment. Alternatively to these embodiments, the system 1 or system 300, may be employed in a public address (PA) system. In a PA system there is no audio system central unit 4. Instead, the actions described as being performed by the audio system central unit 4 may be performed by a speaker controller. Furthermore, there may be multiple "users" in a PA environment. User location may be determined by the methods previously described. Alternatively, the "general location" of the users may be pre-programmed.

In any embodiment, the user position can comprise one or more positions. In particular, a single transmission from the mobile device can indicate a user position for which the audio system is to be configured. The user position can include a pre-set area around the user position. Alternatively, the audio system can receive a plurality of transmissions indicating a plurality of user positions. The plurality of user positions can indicate an area over which the audio system is to be set-up. The user transmissions can be from edges or corners of an area, in order to transmit the location of the area to the audio system, in order to set up the audio system for optimisation for that area. For example, in a PA system the audio system can be configured to be optimised over an area determined by any of these methods.

Numerous positive effects and advantages are provided by the above described embodiments of the invention. The primary advantage is that a user is provided with an easy and reliable method to automatically configure an audio system, in particular, a surround-sound system. For example, the audio system can be a 5.1 or 7.1 home theatre system. Here, the audio system central unit 4 is included in a base unit of the 5.1 or 7.1 surround sound system. With the audio system central unit 4 included in such systems, the user is not required to carry out any separate measurements or manually set the parameters or settings. Additionally, this can be achieved at a low hardware cost, particularly where Bluetooth Low Energy is used.

In other embodiments, the audio system is a stereo system, including left and right speakers. The stereo speakers may be in separate housings, in which case the locations of the speakers and the user (or an optimal location for the user) are calculated and used to configure the audio system. In other embodiments, the audio system is a stereo system including left and right speakers included in a common housing. Such stereo systems are known as sound bars. The left and right speakers are included in the housing of the sound bar at a predetermined separation and orientation. Here, the locations of the sound bar and the user (or an optimal location for the user) are calculated and used to configure the audio system. This may involve calculation of a single location in the sound bar, and optionally also an orientation, or preferably it involves calculating locations of two positions on the sound bar, particularly the ends of the sound bar housing, at which the speakers are located.

Furthermore, as this invention is implemented using Bluetooth technology, audio systems can be remotely connected to mobile devices. In this way, audio data can be easily streamed to and from the mobile device. For example, audio data on the mobile device can be streamed to the central unit.

The mobile device has been described as transmitting only. Alternatively, the mobile device can receive positioning signals or transmit and receive positioning signals. Positioning signals can be received from the speaker units and/or central unit. The received positioning signals at the mobile device can be used to calculate the position of the mobile device, substantially as described above.

Although the memory 14 is illustrated as single components, it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialised circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed function device, gate array or programmable logic device etc.

The invention claimed is:

1. A method of configuring an audio system comprising one or more speaker units, comprising:
    receiving, at an antenna of the audio system, first radio signals transmitted from at least a first location indicating a first speaker unit position, and receiving, at the antenna, second radio signals transmitted from a second location indicating a second speaker unit position or a user position;
    calculating an angle of arrival of each of the first and second radio signals received at the antenna;
    calculating relative positions of the first and second locations based at least partially on the calculated angles of arrival; and
    configuring the audio system based on the calculated relative positions of the first and second locations.

2. The method of claim 1, wherein the antenna comprises a plurality of antenna elements, and the first and second radio signals are received at the plurality of antenna elements and are analyzed to determine the angle of arrival of each of the received first and second radio signals.

3. The method of claim 1, wherein the audio system comprises a mobile device configured to transmit radio signals indicating the user position.

4. The method of claim 1, wherein said antenna is located in at least one speaker unit and/or in a central unit of the audio system connected to the one or more speaker units.

5. The method of claim 1, wherein the first radio signals from the first location indicating the first speaker unit position are received from a mobile device located temporarily at the first speaker unit position.

6. The method of claim 1, further comprising automatically determining parameters for controlling the one or more speaker units based on the calculated relative positions of the first and second locations.

7. An audio system, comprising:
    a receiver configured to receive, at an antenna of the audio system, first radio signals transmitted from at least a first location indicating a first speaker unit position, and second radio signals transmitted from a second location indicating a second speaker unit position or a user position;
    one or more processors and one or more memories including computer program code, the one or more memories and the computer program code configured to, with the one or more processors, cause the audio system at least to perform:
    calculating an angle of arrival of each of the first and second radio signals received at the antenna;
    calculating relative positions of the first and second locations based at least partially on the calculated angles of arrival; and
    configuring the audio system based on the calculated relative positions of the first and second locations.

8. The audio system of claim 7, wherein the antenna comprises a plurality of antenna elements, and the first and second radio signals are received at the plurality of antenna elements and are analyzed to determine the angle of arrival of each of the received first and second radio signals.

9. The audio system of claim 7, further comprising a mobile device configured to transmit signals indicating the user position.

10. The audio system of claim 7, wherein said antenna is located in at least one speaker unit and/or in a central unit of the audio system connected to the one or more speaker units.

11. The audio system of claim 7, wherein the first radio signals from the first location indicating the first speaker unit position are received from a mobile device located temporarily at the first speaker unit position.

12. The audio system of claim 7, wherein the one or more memories and the computer program code are configured to, with the one or more processors, cause the audio system to automatically determine parameters for controlling the one or more speaker units based on the calculated relative positions of the first and second locations.

13. A computer program product comprising a non-transitory computer-readable medium having computer-executable program code stored thereon, which when executed by one or more processors, causes an apparatus to perform:
    receiving, at an antenna of an audio system, first radio signals transmitted from at least a first location indicating a first speaker unit position, and receiving, at the antenna, second radio signals transmitted from a second location indicating a second speaker unit position or a user position;
    calculating an angle of arrival of each of the first and second radio signals received at the antenna;
    calculating relative positions of the first and second locations based at least partially on the calculated angles of arrival; and
    configuring the audio system based on the calculated relative positions of the first and second locations.

14. The computer program product of claim 13, wherein the computer-executable program code, when executed by the one or more processors, causes the apparatus to perform automatically determining parameters for controlling the one or more speaker units based on the calculated relative positions of the first and second locations.

* * * * *